US011536036B2

(12) United States Patent
Jang et al.

(10) Patent No.: US 11,536,036 B2
(45) Date of Patent: Dec. 27, 2022

(54) FLOOR TILE INCLUDING FABRIC MATERIAL AND MANUFACTURING METHOD THEREOF

(71) Applicant: NOX CORPORATION, Chungcheongnam-do (KR)

(72) Inventors: Woon Kyu Jang, Chungcheongnam-do (KR); Young Dae Song, Chungcheongnam-do (KR); So Young Kim, Gyeonggi-do (KR)

(73) Assignee: NOX CORPORATION

( * ) Notice: Subject to any disclaimer, the term of this patent is extended or adjusted under 35 U.S.C. 154(b) by 319 days.

(21) Appl. No.: 16/060,220

(22) PCT Filed: Feb. 25, 2016

(86) PCT No.: PCT/KR2016/001830
§ 371 (c)(1),
(2) Date: Sep. 27, 2018

(87) PCT Pub. No.: WO2017/099294
PCT Pub. Date: Jun. 15, 2017

(65) Prior Publication Data
US 2019/0136548 A1  May 9, 2019

(30) Foreign Application Priority Data
Dec. 9, 2015 (KR) .................. 10-2015-0175056

(51) Int. Cl.
*E04F 15/10* (2006.01)
*B32B 27/12* (2006.01)
(Continued)

(52) U.S. Cl.
CPC .......... *E04F 15/107* (2013.01); *B32B 5/022* (2013.01); *B32B 5/024* (2013.01); *B32B 27/12* (2013.01);
(Continued)

(58) Field of Classification Search
CPC ....... B32B 27/20; B32B 27/304; B32B 27/22; B32B 27/12; B32B 7/02; B32B 5/024;
(Continued)

(56) References Cited

U.S. PATENT DOCUMENTS 4,018,957 A * 4/1977 Werner .................. B32B 5/20
428/141
2005/0255775 A1 * 11/2005 Sultan .................... D02G 3/185
442/210
(Continued)

FOREIGN PATENT DOCUMENTS

CN          1223738 C      10/2005
CN        102470650 A       5/2012
(Continued)

OTHER PUBLICATIONS

"KR200230941_Machine Translation" is a machine translation of KR 20-0230941. (Year: 2001).*
(Continued)

*Primary Examiner* — Larissa Rowe Emrich
(74) *Attorney, Agent, or Firm* — Scully, Scott, Murphy & Presser, P.C.

(57) ABSTRACT

The present invention relates to: a floor tile including a fabric material, and comprising a balancing layer, a noise prevention layer, a functional sheet layer, a fabric material layer, and a surface coating layer; and a manufacturing method thereof and more specifically to a floor tile including a fabric material and a manufacturing method thereof, the floor tile being a functional tile having a natural texture and a three-dimensional effect possessed by the fabric material, having excellent durability, preventing delamination of the fabric material layer, exhibiting excellent mechanical properties such as tensile strength, and enhancing cleaning facilitation.

9 Claims, 4 Drawing Sheets

(51) Int. Cl.

| | | |
|---|---|---|
| *E04F 15/20* | (2006.01) | |
| *B32B 5/02* | (2006.01) | |
| *E04B 1/82* | (2006.01) | |
| *E04F 15/22* | (2006.01) | |
| *B32B 27/20* | (2006.01) | |
| *E04C 2/32* | (2006.01) | |
| *B32B 27/32* | (2006.01) | |
| *B32B 27/36* | (2006.01) | |
| *B32B 27/30* | (2006.01) | |
| *B32B 27/22* | (2006.01) | |
| *B32B 37/18* | (2006.01) | |

(52) U.S. Cl.
CPC .............. *B32B 27/20* (2013.01); *B32B 27/22* (2013.01); *B32B 27/302* (2013.01); *B32B 27/304* (2013.01); *B32B 27/306* (2013.01); *B32B 27/308* (2013.01); *B32B 27/32* (2013.01); *B32B 27/322* (2013.01); *B32B 27/36* (2013.01); *B32B 37/182* (2013.01); *E04B 1/82* (2013.01); *E04C 2/32* (2013.01); *E04F 15/105* (2013.01); *E04F 15/206* (2013.01); *E04F 15/225* (2013.01); *B32B 2250/04* (2013.01); *B32B 2250/05* (2013.01); *B32B 2255/02* (2013.01); *B32B 2255/26* (2013.01); *B32B 2262/0276* (2013.01); *B32B 2262/101* (2013.01); *B32B 2264/102* (2013.01); *B32B 2264/104* (2013.01); *B32B 2264/12* (2013.01); *B32B 2307/102* (2013.01); *B32B 2307/40* (2013.01); *B32B 2307/54* (2013.01); *B32B 2307/554* (2013.01); *B32B 2307/7145* (2013.01); *B32B 2307/734* (2013.01); *B32B 2419/04* (2013.01); *B32B 2471/00* (2013.01); *E04B 2001/8254* (2013.01); *E04F 2290/041* (2013.01)

(58) Field of Classification Search
CPC .......... B32B 2307/554; B32B 2307/40; B32B 2307/7145; B32B 2307/54; B32B 2307/734; B32B 2307/102; B32B 2264/12; B32B 2264/104; B32B 2264/102; B32B 2262/0276; B32B 2262/101; B32B 2250/04; B32B 2250/05; B32B 2471/00; B32B 2255/02; B32B 2255/26; B32B 2419/04; E04F 15/107; E04F 15/206; E04F 15/105; E04F 15/225; E04F 15/10; E04F 2290/041; E04C 2/32; E04B 1/82; E04B 2001/8254
USPC ................................ 428/297.7, 298.7, 300.7
See application file for complete search history.

(56) References Cited

U.S. PATENT DOCUMENTS

| | | | |
|---|---|---|---|
| 2012/0189819 A1 | 7/2012 | Chang | |
| 2014/0255659 A1* | 9/2014 | Windmoller | B32B 27/12 |
| | | | 428/193 |
| 2015/0210055 A1* | 7/2015 | Pervan | C09D 11/38 |
| | | | 524/388 |
| 2016/0251800 A1* | 9/2016 | Rose | D06N 3/0011 |
| | | | 442/64 |

FOREIGN PATENT DOCUMENTS

| | | | | |
|---|---|---|---|---|
| JP | 3166171 A | | 2/2011 | |
| KR | 20-0230941 | * | 7/2001 | |
| KR | 20-0230941 A | * | 7/2001 | |
| KR | 20-0230941 Y1 | | 7/2001 | |
| KR | 20020065151 A | | 8/2002 | |
| KR | 10-0363109 | | 12/2002 | |
| KR | 20030018670 A | * | 3/2003 | |
| KR | 10-0380042 | | 4/2003 | |
| KR | 20040033815 A | | 4/2004 | |
| KR | 10-2004-0065494 | | 7/2004 | |
| KR | 20040065494 A | | 7/2004 | |
| KR | 10-0524854 | | 10/2005 | |
| KR | 10-2009-0005529 | | 1/2009 | |
| KR | 20090005529 A | * | 1/2009 | |
| KR | 10-2011-0133798 | | 12/2011 | |
| KR | 10-2013-0141860 | | 12/2013 | |
| KR | 10-1395714 A | * | 5/2014 | |
| KR | 20140058957 A | * | 5/2014 | ............ B32B 37/00 |
| RU | 96352 U1 | | 7/2010 | |
| WO | 2014/073792 A1 | | 5/2014 | |

OTHER PUBLICATIONS

"KR101395714_Machine Translation" is a machine translation of KR-10-1395714-A. (Year: 2013).*
"KR20030018670_Machine Translation" is a machine translation of KR-20030018670-A. (Year: 2003).*
"KR20090005529_Machine Translation" is a machine translation of KR-20090005529-A. (Year: 2009).*
"KR20140058957_Machine Translation" is a machine translation of KR-20140058957-A. (Year: 2014).*
Search Report dated Apr. 17, 2019 received from the Federal Service on Intellectual Property of Russia in corresponding Russian Patent Application No. 2018124801/03, 4 pages.
International Search Report dated Sep. 1, 2016 issued in PCT/KR2016/001830.
Korean Office Action dated Apr. 13, 2017 in Korean Patent Application No. 10-2015-0175056.
Extended Supplementary European Search Report dated Jul. 2, 2019 in European Patent Application No. 16873160.2.

* cited by examiner

Comparative Example 1

Example 1

Comparative Example 1

Example 1

FLOOR TILE INCLUDING FABRIC MATERIAL AND MANUFACTURING METHOD THEREOF

TECHNICAL FIELD

The present invention relates to a floor tile including a fabric material and a manufacturing method thereof, and more particularly to a floor tile including a fabric material, which has excellent durability and cleaning ease while retaining the three-dimensional feeling and surface texture of the fabric material itself, unlike conventional floor tiles, and to a manufacturing method thereof.

BACKGROUND ART

Conventional PVC-based floor tiles have generally been formed by inserting a printed layer, made by a gravure printing or transfer method, to thus provide a visual design to the product, coating a transparent layer on the printed layer, embossing the transparent layer by heat and pressure to thus give a texture and a three-dimensional feeling to the product, and coating a PU layer to thus improve the contamination resistance, scratch resistance, antibacterial properties and the like of the tile. In recent years, attempts have been constantly made to produce more gentle and luxurious floor tiles by applying the visual effects of textures of textile materials to these conventional floor tiles. However, problems arise in that conventional production methods encounter limitations in retaining the characteristic surface texture or three-dimensional feeling of the fabric material and in that the fabric material layer is easily peeled off from the floor tile.

In general, carpets and carpet tiles are mainly used as textile floorings. These products need to be bonded to the entire surface of the floor during tiling. In particular, the carpet tiles need to be tiled per piece, and thus the tiling work is very complicated and takes a lot of time. In addition, during use, the carpet tiles pose problems such as surface contamination, fungal and bacterial proliferation, dust generation, and allergy. Due to these problems, the demand for these products is rapidly decreasing.

As a way to solve these problems, there have been developed the following floorings: 1) a flooring manufactured finishing a fabric surface layer with an UV coating; 2) a flooring exhibiting fabric effects provided by gravure or transfer printing; 3) a flooring manufactured integrating a glass fiber sheet layer containing a colored fiber pile with a gravure-printed vinyl chloride resin layer; and the like.

However, the flooring of 1) has a problem in that because the fabric is exposed upward, the fabric is damaged during use; the flooring of 2) has a problem in that the monotony of appearance by planar printing, compared to a fabric, is unavoidable; and the flooring of 3) also has a disadvantage in that it expresses just a fibrous feeling by printing.

Meanwhile, even when the flooring surface includes a fabric layer as in Korean Patent Application Publication No. 10-2002-0012044, problems arise in that the fabric layer is damaged when used for a certain period of time, and is not easily cleaned due to the characteristics of the material, and thus is susceptible to contamination by external substances.

Accordingly, the present inventors have paid attention to the fact that it is necessary to develop a flooring which includes a fabric layer having improved durability and cleaning ease while retaining the characteristic surface texture or three-dimensional feeling of the fabric material, thereby completing the present invention.

DISCLOSURE

Technical Problem

An object of the present invention is to provide a floor tile including a fabric material, which retains the natural texture and three-dimensional feeling of the fabric material, and a manufacturing method thereof.

Another object of the present invention is to provide a floor tile including a fabric material, which prevents peeling of a fabric material layer with a functional intermediate layer or the like and has enhanced mechanical properties such as tensile strength, and a manufacturing method thereof.

Still another object of the present invention is to provide a floor tile including a fabric material, which has improved ease of cleaning against contaminants, and a manufacturing method thereof.

Other objects and advantages of the present invention will be more apparent from the following detailed description of the present invention and the attached claims.

Technical Solution

Embodiments of the present invention are provided to more fully describe the present invention to those skilled in the art. However, these embodiments may be modified in different forms, and the scope of the present invention is not limited to these embodiments. Rather, these embodiments are provided to make the present disclosure thorough and complete and to fully convey the spirit of the present invention to those skilled in the art.

Furthermore, in the drawings, the thickness or size of each layer is exaggerated for easy of description and clarity. Throughout the drawings, the same reference numerals refer to the same elements. As used herein, the term "and/or" includes any and all combinations of one or more of the associated listed items.

The terms used herein are used to describe particular embodiments, but are not intended to limit the scope of the present invention. As used herein, a singular form may include a plural expression, unless the context clearly indicates otherwise unless specified otherwise in the context thereof. As used herein, the terms "comprise" and/or "comprising" specify the presence of stated shapes, integers, steps, operations, elements, components, and/or groups thereof, but do not preclude the presence or addition of one or more other shapes, integers, steps, operations, elements, components and/or groups thereof.

One embodiment of the present invention is directed to a floor tile including: a balancing layer; an anti-noise layer; a functional intermediate layer; a fabric material layer; and a surface coating layer. More specifically, the floor tile of the present invention may include: a balancing layer configured to be disposed on a floor surface, and to prevent bending of the floor tile; an anti-noise layer configured to prevent noise transmission; a functional intermediate layer configured to enhance the adhesion between the anti-noise layer and a fabric material layer, and to improve cleaning ease; a fabric material layer including a thermoplastic resin fiber coated with a polymer resin; and a surface coating layer configured to protect the fabric material layer from an external environment, and to prevent surface contamination. This floor tile including the fabric material may have a square or rectangular plate shape, but is not limited to this shape.

In one embodiment of the present invention, the floor tile may include: a fabric material layer formed on the lower surface of a surface coating layer; a functional intermediate layer formed on the lower surface of the fabric material layer; an anti-noise layer formed on the lower surface of the functional intermediate layer; and a balancing layer formed on the lower surface of the anti-noise layer.

In one embodiment of the present invention, the uppermost layer of the floor tile is a surface coating layer, and a fabric material layer is formed on the lower surface of the coating layer. A functional intermediate layer is disposed on the lower surface of the fabric material layer, and thus the adhesion of the fabric material layer may be enhanced such that peeling of the fabric material layer may be reduced, and cleaning ease of the floor tile may also be improved. In addition, an anti-noise layer is formed on the lower surface of the functional intermediate layer, and a balancing layer may additionally be formed on the lower surface of the anti-noise layer. However, the present invention is not limited to this embodiment.

In one embodiment of the present invention, the floor tile includes an anti-noise layer, in which the anti-noise layer may include a single anti-noise layer or a plurality of anti-noise layers. Namely, the anti-noise layer may be a single layer or a plurality of layers.

In one embodiment of the present invention, the surface coating layer may include a transparent urethane- or acrylic-based resin, but is not limited thereto. The surface coating layer prevents discoloration of the fabric material layer by blocking UV light, efficiently reduces damage, abrasion, contamination and the like, and generally forms an apparently transparent coating layer.

The thickness of the surface coating layer is generally 4 to 50 μm, preferably 6 to 35 μm. If the thickness of the surface coating layer is less than 4 μm, there will be problems in that the UV blocking effect is reduced, damage and abrasion increase, the contamination resistance, scratch resistance and antibacterial properties of the floor tile are reduced. If the thickness of the surface coating layer is more than 50 μm, problems arise in that, because the thickness of the coating layer is excessively thick, the natural texture and three-dimensional feeling of the fabric material layer are offset, and cost effectiveness is reduced.

In one embodiment of the present invention, the fabric material layer serves to give a natural texture and a three-dimensional feeling, which are possessed by a fabric material. The fabric material layer includes a thermoplastic polymer fiber coated with a polymer resin.

The fabric material layer of the present invention includes a fabric material woven with a fiber coated with a polymer resin, and thus peeling of the fabric material layer can be effectively prevented, unlike floor tiles including conventional fabric materials. In addition, in the case of fabric materials, a purging phenomenon may arise in which the fabric material is pocked out of a coating material or a woven fabric structure with the passage of time and usage environment. However, as described above, when the fabric material is woven with the fiber coated with the polymer resin not showing big difference in shrinkage rate and melting point from the thermoplastic resin, the cohesion of the fabric material can be enhanced, and thus the purging phenomenon can be prevented in which the fabric material is pocked out of a coating material or a woven fabric structure. Examples of fabric weaving patterns may include twill weave, leno weave, plain weave, satin weave, and the like. In addition, the fabric material layer incudes a surface coating layer. It can minimize discoloration of the floor tile by efficiently blocking UV light, and can also reduce damage, abrasion, contamination and the like of the floor tile.

Specifically, the polymer resin includes one or more selected from the group consisting of polyethylene resin, polypropylene resin, ABS (acrylonitrile-butadiene-styrene) resin, polyvinyl chloride resin, acrylic resin, polyester resin, polystyrene resin, polytetrafluoroethylene, rubber, ethylene-vinyl acetate copolymers, and ethylene-propylene copolymers. Preferably, it is polyvinyl chloride (PVC) resin, but is not limited thereto. The thermoplastic resin includes one or more selected from the group consisting of polyolefin, polyurethane, acrylic resin, polyester, polyvinyl chloride resin, nylon resin, and mixtures thereof. More specifically, the polyurethane resin is selected from the group consisting of linear low-density polyethylene (LLDPE) resin, low-density polyethylene (LDPE) resin, medium-density polyethylene (MDPE) resin, high-density polyethylene (HDPE) resin, ethylene vinyl acetate (EVA) copolymer resin, polypropylene (PP) resin, PP-based block copolymer resin, PP-based random polymer resin, PP-based elastomer resin, and mixtures thereof, but is not limited thereto.

The thickness of the fabric material layer is 0.20 to 5.0 mm, preferably 0.50 to 2.5 mm. If the thickness of the fabric material layer is less than 0.20 mm, there will be a problem in that the texture and three-dimensional feeling thereof are reduced. If the thickness is more than 5.0 mm, there will be problems in that cost effectiveness is reduced and cleaning against foreign matter is not easy.

In addition, the fabric material layer that is applied to the floor tile of the present invention may include a flame retardant for improving flame retardancy. Examples of the flame retardant include halogen-, phosphorus- or nitrogen-based flame retardants, and inorganic flame retardants such as metal oxides, metal hydroxides and the like.

Specifically, halogen-based flame retardants include, but are not limited to, decabromodiphenyl oxide (DBDPO), decabromodiphenyl ethane (DBDPE), hexabromocyclodecane (HBCD), 1,2,5,6,9,10-hexabromocyclodecane (HBCD), tetrabromobisphenol A (TBBA), tetrabromobisphenol A bis(2,3-dibromopropylether)(BDDP), and the like.

Phosphorus-based flame retardants include, but are not limited to, melamine phosphate (MP), melamine polyphosphate (MPP), ammonium phosphate, ammonium polyphosphate (APP), red phosphorus, tris(2-chloroethyl)phosphate (TCEP), tris(1-chloro-2-propyl)phosphate (TCPP), isopropylphenyl diphenyl phosphate (IPPP), triphenyl phosphate (TPP), triethyl phosphate (TEP), resorcinol diphosphate (RDP), tricresyl phosphate (TCP), dimethyl methyl phosphonate, diethyl ethyl phosphonate, dimethyl propyl phosphonate, diethyl N,N-bis(2-hydroxyethyl)aminomethyl phosphonate, phosphonic acid, methyl(5-methyl-2-methyl-1,3,2-dioxaphosphorinan-5-yl)methyl ester P,P'-dioxide, 9,10-dihydro-9-oxa-10-phosphaphenanthrene-10-oxide (DOPO), poly(1,3-phenylenemethyl phosphonate), hexaphenoxy cyclophosphazene, phosphophenanthrene, and the like.

Nitrogen-based flame retardants include, but are not limited to, melamine phosphate (MP), nitrilotris(methylphosphonate), melamine cyanurate, and the like.

Inorganic flame retardants include, but are not limited to, magnesium dihydroxide (MDH), aluminum trihydroxide (ATH), zinc borate, graphite, antimony trioxide, and the like.

Among them, phosphorus-based and/or inorganic flame retardants are preferably used in order to improve environment-friendliness and flame retardant properties. For example, melamine phosphate, melamine polyphosphate, ammonium phosphate, isopropylphenyl diphenyl phosphate (IPPP), triphenyl phosphate (TPP), triethyl phosphate (TEP), resorcinol diphosphate (RDP), tricresyl phosphate (TCP), magnesium dihydroxide (MDH), aluminum trihydroxide (ATH), zinc borate, antimony trioxide and the like are preferably used.

As used herein, the term "coated yarn" refers to a yarn having a protective layer made by forming a thin film layer on the yarn surface in order to increase the strength of the yarn, and the term "extruded yarn" refers to a yarn manufactured extrusion.

One example of the fabric material layer of the present invention may be a fabric material layer woven using the extruded yarn only as a warp yarn. Another example may be a fabric material layer woven using the extruded yarn using both a warp yarn and a weft yarn. Specifically, when an extruded yarn having a diameter of 600 to 5,000 μm is used only as a warp yarn, weaving may be performed using, as a weft yarn, an extruded yarn having a smaller diameter, for example, a diameter of 50 to 2,000 μm, more preferably 200 to 800 μm. In this case, the composition of the extruded yarn as the weft yarn may be the same as or similar to the composition of the extruded yarn as the warp yarn. Alternatively, weaving may be performed using a coating yarn having a diameter of 50 to 2,000 μm as a weft yarn. The coating yarn that may be used as a weft yarn has a structure composed of a core yarn and a coating material covering the surface of the core yarn.

One embodiment of the present invention is directed to a floor tile including a fiber material, wherein a functional intermediate layer includes a polymer resin, a plasticizer, a stabilizer, a filler and a pigment. Specifically, the functional intermediate layer may include, based on 100 parts by weight of the polymer resin, 5 to 50 parts by weight of the plasticizer, 3 to 10 parts by weight of the stabilizer, 0 to 20 parts by weight of the filler, and 0.05 to 15 parts by weight of the pigment. Preferably, it may include, based on 100 parts by weight of the polymer resin, 30 to 50 parts by weight of the plasticizer, 3 to 7 parts by weight of the stabilizer, 1 to 10 parts by weight of the filler, and 2 to 7 parts by weight of the pigment.

If the amount of plasticizer used is less than 5 parts by weight, there will be a problem in that adhesion to the fabric material layer is significantly reduced. If the amount of plasticizer used is more than 50 parts by weight, there will be a problem in that mechanical properties (such as tensile strength) are reduced. If the amount of filler used is more than 20 parts by weight, there will be a disadvantage in that adhesion to the fabric material layer is significantly reduced.

In addition, if the amount of stabilizer used is less than 3 parts by weight, thermal stability can be reduced and discoloration of the product can occur, and if the amount is more than 10 parts by weight, cost effectiveness will be reduced. If the amount of pigment used is less than 0.05 parts by weight, a desired opacity and a desired color cannot be obtained, and if the amount is 15 parts by weight, cost effectiveness will be reduced.

In one embodiment of the present invention, the degree of polymerization of the polymer resin included in the functional intermediate layer is 600 to 2000, preferably 800 to 1700, more preferably 1000. The polymer resin includes one or more selected from the group consisting of polyethylene resin, polypropylene resin, ABS (acrylonitrile-butadiene-styrene) resin, polyvinyl chloride resin, acrylic resin, polyester resin, polystyrene resin, polytetrafluoroethylene, rubber, ethylene-vinyl acetate copolymers, and ethylene-propylene copolymers. Preferably, the polymer resin is polyvinyl chloride resin. If the degree of polymerization of the polymer resin is less than 600, there will be a problem in that mechanical properties are deteriorated, and if the degree of polymerization is more than 2000, a problem may arise in that processing temperature increases, that is, processability decreases.

In one embodiment of the present invention, the plasticizer that may be included in the functional intermediate layer includes one or more selected from the group consisting of dioctyl phthalate (DOP), diisononyl phthalate (DINP), diisodecyl phthalate (DIDP), diundecyl phthalate (DUP), trioctyl trimellitate (TOTM), dioctyl adipate (DOA), dioctyl terephthalate (DOTP), 1,2-cyclohexane dicarboxylic acid diisononyl ester (DINCH), dipropylheptylphthalate (DPHP), acetyltributylcitrate (ATBC), vegetable plasticizers, and benzoate. The plasticizer is preferably dioctyl terephthalate (DOTP) which is an environmentally friendly plasticizer, but is not limited thereto.

In one embodiment of the present invention, the stabilizer that is included in the functional intermediate layer includes one or more selected from the group consisting of a metal soap-based stabilizer, an organic tin stabilizers, and an epoxy-based stabilizer. The metal soap-based stabilizer includes one or more selected from the group consisting of, for example, Ba/Zn, Ca/Zn and Na/Zn, and is preferably an environmentally friendly Ca/Zn-based stabilizer, but is not limited thereto.

In one embodiment of the present invention, the filler that is included in the functional intermediate layer includes one or more selected from the group consisting of calcium carbonate, silica, alumina, sepiolite, talc, antimony oxide, aluminum oxide, fly ash, and blast-furnace slag. It preferably includes one or more selected from the group consisting of calcium carbonate, sepiolite, and a mixture thereof, but is not limited thereto.

In one embodiment of the present invention, the filler that is included in the functional intermediate layer invention includes one or more selected from the group consisting of organic pigments, inorganic pigments, and mixtures thereof. The inorganic pigment is preferably anatase titanium dioxide ($TiO_2$) or rutile titanium dioxide ($TiO_2$), more preferably rutile titanium dioxide ($TiO_2$), but is not limited thereto. The pigment included in the functional intermediate layer may include inorganic pigments and organic pigments having various colors, and serves to improve hiding power.

In one embodiment of the present invention, the thickness of the functional intermediate layer is 0.05 to 1.5 mm, preferably 0.07 to 1 mm. If the thickness of the functional intermediate layer is less than 0.05 mm, a problem may arise in that the fabric material layer is peeled off during use of the floor tile due to weak adhesion between the anti-noise layer and the fabric material layer. If the thickness of the functional intermediate layer is more than 1.5 mm, there will be a problem in that cost effectiveness is reduced.

In one embodiment of the present invention, the coating layer of the fabric material layer and the functional intermediate layer in the floor tile preferably include the same kind of polymer resin. When the coating layer for protecting the fabric material layer includes the same polymer resin as that of the functional intermediate layer, peeling of the fabric material layer can be prevented, and mechanical properties such as tensile strength may be enhanced. Namely, when the surface coating layer of the fiber and the functional intermediate layer include the same kind of polymer resin, the adhesion of the same kind of polymer resin can be improved. This improvement in adhesion can lead to prevention of peeling of the fabric material layer and enhancement of mechanical properties. However, the adhesion does not mean bonding by use of a separate adhesive material.

More specifically, the fabric material layer is a fabric material woven with a fiber coated with a polymer resin, and the polymer resin used to coat the fiber is the same polymer resin as the polymer resin of the functional intermediate layer. For example, when the polymer resin used to coat the thermoplastic resin fiber is polyethylene resin, the functional intermediate layer preferably includes polyethylene resin. When the thermoplastic resin fiber is coated with polyvinyl chloride resin, the functional intermediate resin preferably includes polyvinyl chloride resin.

Specifically, the polymer resin includes one or more selected from the group consisting of polyethylene resin, polypropylene resin, ABS (acrylonitrile-butadiene-styrene) resin, polyvinyl chloride resin, acrylic resin, polyester resin, polystyrene resin, polytetrafluoroethylene, rubber, ethylene-vinyl acetate copolymers, and ethylene-propylene copolymers. It is preferably polyvinyl chloride resin, but is not limited thereto.

In one embodiment of the present invention, the balancing layer and anti-noise layer may include a polymer resin, a filler and an additive. The balancing layer is to be disposed on the floor surface and serves to prevent bending of the floor tile, and the anti-noise layer serves to prevent noise transmission. The additive includes one or more selected from the group consisting of a plasticizer, a stabilizer, a pigment and a flame retardant.

Specifically, the balancing layer includes one or more polymer resins selected from the group consisting of polyethylene resin, polypropylene resin, ABS (acrylonitrile-butadiene-styrene) resin, polyvinyl chloride resin, acrylic resin, polyester resin, polystyrene resin, polytetrafluoroethylene, rubber, ethylene-vinyl acetate copolymers, and ethylene-propylene copolymers, and also includes one or more fillers selected from the group consisting of calcium carbonate, silica, alumina, sepiolite, talc, antimony oxide, aluminum oxide, fly ash, and blast-furnace slag.

In addition, the balancing layer of the present invention may include a plurality of irregularities on the lower surface. When the lower surface of the balancing layer includes a plurality of irregularities, the removal of moisture or gas can be facilitated, and deformation of the floor tile can be efficiently reduced due to the removal of moisture or gas, thereby reducing limitations on a place where the floor tile is to be disposed, compared to when the balancing layer has a flat lower surface. The thickness of the balancing layer is 0.3 to 5 mm, preferably 0.5 to 2.5 mm. If the thickness of the balancing layer is less than 0.3 mm, it will not be suitable for prevention of bending of the floor tile, and if the thickness is more than 5 mm, cost effectiveness will be reduced.

Specifically, the anti-noise layer includes a polymer resin and a filler, and the anti-noise layer may be composed of a single anti-noise layer or a plurality of anti-noise layers. When a single anti-noise layer is included, it is composed of one anti-noise layer, but when a plurality of anti-noise layers is included, it may include an anti-stretch layer between the anti-noise layers. The polymer resin includes one or more selected from the group consisting of polyethylene resin, polypropylene resin, ABS (acrylonitrile-butadiene-styrene) resin, polyvinyl chloride resin, acrylic resin, polyester resin, polystyrene resin, polytetrafluoroethylene, rubber, ethylene-vinyl acetate copolymers, and ethylene-propylene copolymers. Preferably, it is polyvinyl chloride (PVC) resin. The filler includes one or more fillers selected from the group consisting of calcium carbonate, silica, alumina, sepiolite, talc, antimony oxide, aluminum oxide, fly ash, barium sulfate, and blast-furnace slag. The filler is preferably calcium carbonate or sepiolite, but may be selected from among a variety of known mineral materials that function to reduce stretching and noise.

The thickness of the anti-noise layer is 0.3 to 5 mm, preferably 0.5 to 2.5 mm. If the thickness of the anti-noise layer is less than 0.3 mm, the anti-noise effect thereof will be insufficient, and if the thickness is more than 5 mm, cost effectiveness will be reduced.

In one embodiment of the present invention, the floor tile may further include an anti-stretch layer. The anti-stretch layer serves to prevent stretching of the floor tile from being caused by environmental factors, and may further be included in the floor tile including: a balancing layer; an anti-noise layer; a functional intermediate layer; a fabric material layer; and a surface coating layer. For example, the anti-stretch layer may be located between the balancing layer and the anti-noise layer or between the anti-noise layer and the functional intermediate layer. When the anti-noise layer is composed of a plurality of layers, the anti-stretch layer may be located between a first anti-noise layer and a second anti-noise layer, but is not limited thereto.

In one embodiment of the present invention, the anti-stretch layer that may be included in the floor tile includes a glass fiber or nonwoven fabric including a polymer resin, and the anti-stretch layer serves to prevent stretching of the floor tile from being caused by environmental factors. The polymer resin includes one or more selected from the group consisting of polyethylene resin, polypropylene resin, ABS (acrylonitrile-butadiene-styrene) resin, polyvinyl chloride resin, acrylic resin, polyester resin, polystyrene resin, polytetrafluoroethylene, rubber, ethylene-vinyl acetate copolymers, and ethylene-propylene copolymers, and is preferably polyvinyl chloride (PVC) resin, but is not limited thereto.

Specifically, the anti-stretch layer has a thickness of 0.1 to 1 mm, preferably 0.2 to 0.5 mm. If the thickness of the anti-stretch layer is less than 0.1 mm, the effect of preventing stretching of the floor tile will be insufficient, and if the thickness of the anti-stretch layer is more than 1 mm, cost effectiveness will be reduced.

One embodiment of the present invention is directed to a method for manufacturing a floor tile including a fabric material, the method including: producing a balancing layer, an anti-noise layer, a functional intermediate layer and a fabric material layer by a heat pressing process; and coating a liquid raw material for surface coating on the fabric material layer, followed by curing using an UV irradiation device, thereby producing a surface coating layer, wherein the floor tile further includes an anti-stretch layer and an anti-noise layer (i.e., a second anti-noise layer). In the heat pressing process, the balancing layer, the anti-noise layer, the functional intermediate layer and the fabric material layer are bonded to one another by heat pressing at a temperature of 80 to 250° C. The heat pressing may be performed using various methods known in the art, and the heat pressing method is not particularly limited. For example, it may be performed using a roll pressing method, a heat press method or the like.

In the present invention, the total thickness of the floor tile is 2 to 20 mm, preferably 2 to 10 mm, more preferably 2 to 7 mm. If the thickness of the floor tile is less than 2 mm, problems may arise in that, because the thickness of the floor tile is excessively thin, bending of the floor tile may occur when the floor tile is placed on a floor surface, and in that the anti-noise effect and mechanical properties of the floor tile are reduced. If the thickness of the floor tile is more than 20 mm, cost effectiveness will be reduced.

In one embodiment of the present invention, the floor tile may include: a balancing layer having a thickness of 0.3 to 5.0 mm; an anti-noise layer having a thickness of 0.3 to 5.0 mm; a functional intermediate layer having a thickness of 0.05 to 1.5 mm; a fabric material layer having a thickness of 0.2 to 5.0 mm; and a surface coating layer having a thickness of 4 to 50 μm.

In one embodiment of the present invention, the balancing layer may include, based on 100 parts by weight of a polymer resin, 21 to 100 parts by weight of a filler; the anti-noise layer may include, based on 100 parts by weight of a polymer resin, 110 to 1500 parts by weight of a filler; and the functional intermediate layer may include, based on 100 parts by weight of a polymer resin, 0 to 20 parts by weight of a filler. The fabric material layer may be composed of a fabric layer woven with a polyester extruded yarn coated with polyvinyl chloride resin, and the surface coating layer may include a transparent urethane material.

Advantageous Effects

According to the present invention, there is provided the floor tile including a fabric material, which prevents the fabric material layer from being peeled off while retaining the natural texture and three-dimensional feeling of the fabric material and which has improved cleaning ease as well as excellent durability due to improved mechanical properties such as tensile strength, and a manufacturing method thereof.

MODE FOR INVENTION

The present invention will be described in more detail below in conjunction with examples. These examples are intended merely to describe the present invention in terms of practice. It will be apparent to those skilled in the art that the scope of the present invention according to the gist of the present invention is not limited by these embodiments.

Figure 1:
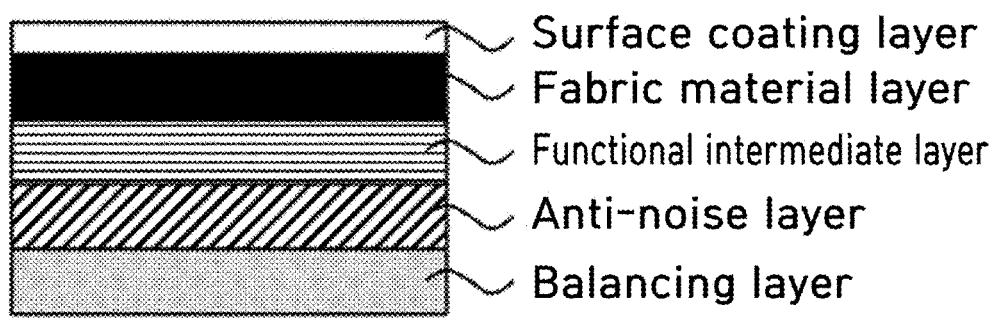
FIG. 1 is a sectional view of a floor tile including a fabric material according to an embodiment of the present invention.

FIG. 1 is a sectional view showing a floor tile including a fabric material according to one embodiment of the present invention. The floor tile includes: a balancing layer configured to be disposed on the floor surface, and to prevent bending of the floor tile; an anti-noise layer deposited on the balancing layer and configured to prevent noise transmission; a functional intermediate layer deposited on the anti-noise layer and configured to assist in adhesion of a fabric material layer and also to improve cleaning ease of the floor tile; a fabric material layer deposited on the functional intermediate layer and configured to give a visual design, a surface texture, a three-dimensional feeling and the like to the floor tile; and a surface coating layer deposited on the fabric material layer and configured to protect the fabric material layer and preventing surface contamination.

Figure 2:
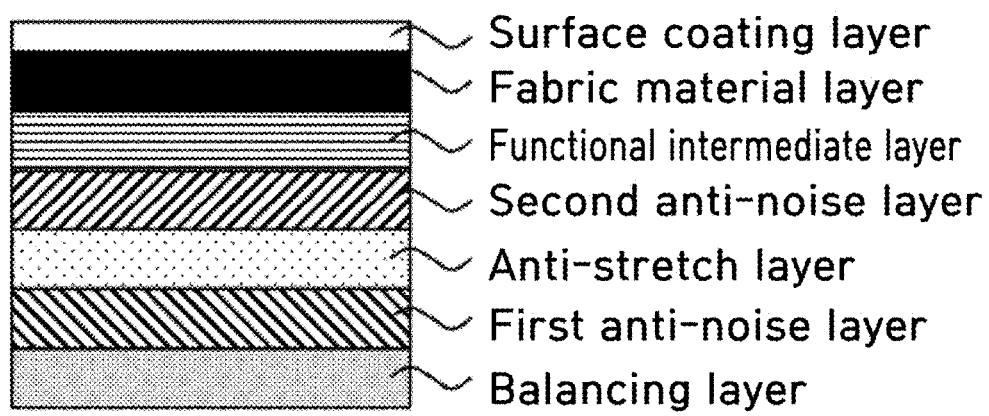
FIG. 2 is a sectional view showing another example of a floor tile including a fabric material according to an embodiment of the present invention.

FIG. 2 is a sectional view showing another example of a floor tile including a fabric material according to one embodiment of the present invention. As shown in the drawing, the floor tile includes: a balancing layer configured to be disposed on a building floor, and to prevent bending of the floor tile; a first anti-noise layer deposited on the balancing layer and configured to prevent noise transmission; an anti-stretch layer deposited on the first anti-noise layer and configured to prevent the floor tile from being stretched by environmental factors in a place where the floor tile is disposed; a second anti-noise layer deposited on the anti-stretch layer and configured to prevent noise transmission; a functional intermediate layer deposited on the second anti-noise layer, and configured to assist in adhesion of a fabric material layer and also to improve cleaning ease of the floor tile; a fabric material layer deposited on the functional intermediate layer and configured to give a visual design, a surface texture, a three-dimensional feeling and the like to the floor tile; and a surface coating layer deposited on the fabric material layer and configured to protect the fabric material layer and to prevent surface contamination.

Example 1

Production of Floor Tile Including Fabric Material

A floor tile including a fabric material was manufactured by bonding a balancing layer, a first anti-noise layer, an anti-stretch layer, a second anti-noise layer, a functional intermediate layer and a fabric material layer to one another by a heat pressing process at a temperature of 150° C., and then coating a liquid raw material for surface coating on the fabric material layer, and curing the surface coating layer with an UV irradiation device. The detailed composition and thickness of each of the layers are as follows.

The balancing layer is 1 mm in thickness, includes PVC and includes, based on 100 parts by weight of PVC, 65 parts by weight of a filler, and a plurality of irregularities is formed on the lower surface thereof. The first anti-noise layer includes PVC, includes, based on 100 parts by weight of PVC, 350 parts by weight of calcium carbonate, and is 1.5 mm in thickness. The anti-stretch layer is made of PVC-impregnated glass fiber, includes, based on 100 parts by weight of PVC, 55 parts by weight of a filler, and is 1 mm in thickness. The second anti-noise layer includes PVC, includes, based on 100 parts by weight of PVC, 500 parts by weight of calcium carbonate, and is 1.5 mm in thickness. The functional intermediate layer includes 100 parts by weight of PVC, 45 parts by weight of DOTP, 4.5 parts by weight of a Ca/Zn-based stabilizer, 8 parts by weight of calcium carbonate as a filler, and 5 parts by weight of a titanium dioxide-containing pigment as other additive, and is 0.2 mm in thickness. The fabric material layer is a fabric material woven with a thermoplastic polyester resin coated with PVC resin, and is 1.5 mm in thickness, and the surface coating layer is transparent urethane resin and is 20 μm in thickness.

Comparative Example 1

A floor tile including a fabric material was manufactured in the same manner as described in Example 1, except that the functional intermediate layer was not formed.

Comparative Example 2

A floor tile was manufactured in the same manner as described in Example 1, except that the functional intermediate layer was formed to have a thickness of 0.02 mm.

Comparative Example 3

A floor tile was manufactured in the same manner as described in Example 1, except that the fabric material layer and the intermediate layer were formed by an impregnation process, not by a heat pressing process. In the impregnation process, the bottom portion of the fabric layer was immersed in a liquid blend for a PVC-impregnated layer, and then solidified by heating in an oven at 200° C. and cooling to room temperature. The PVC-impregnated layer included PVC, included, based on 100 parts by weight of PVC, 70 parts by weight of DOTP, 4.5 parts by weight of a Ca/Zn-based stabilizer, and 70 parts by weight of calcium carbonate as a filler, and was 0.4 mm in thickness.

Comparative Example 1

Examination of Whether Peeling of Fabric Material Layer Occurred

The floor tiles of Examples 1 and Comparative Examples 1 and 2 were tested according to the test method of KS M 3802:2014, thereby determining whether peeling would occur. The results are shown in Table 1 below and FIG. 3.

TABLE 1

| | Mean peel strength (N/cm) | | | | | | |
|---|---|---|---|---|---|---|---|
| | 10 | 20 | 30 | 40 | 50 | 60 | 70 |
| Example 1 | X | X | X | X | X | X | X |
| Comparative Example 1 | X | X | X | X | O | O | O |
| Comparative Example 2 | X | X | X | X | X | X | O |

(O: peeling occurred; X: no peeling occurred).

Figure 3:
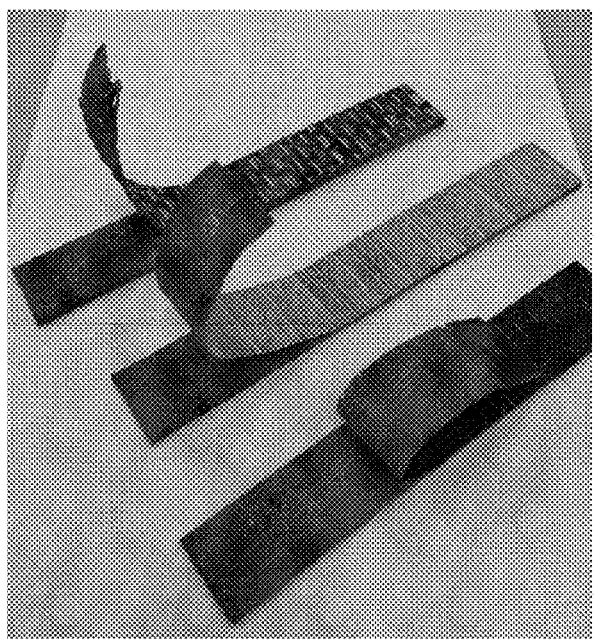
FIG. 3 is a photograph showing peeling of a fabric material layer from a bottom floor having no functional intermediate layer.

As shown in Table 1 above and FIG. 3, in the case of Comparative Example 1 having no functional intermediate layer, peeling did not occur at a load of up to 40 N, but peeling occurred at a load equal to or higher than 50 N. Even in the case of Comparative Example 2 including a 0.2-mm thick functional intermediate layer, peeling did not occur at a load of up to 60 N, but peeling occurred at 70 N. In the case of the floor tile of Example 1, which included the functional intermediate layer, peeling did not occur even at 70 N.

In conclusion, it appears that in the case of floor tiles that are disposed on the floor surface, a load will naturally be applied to the floor tiles in an environment in which people walk and live, and peeling will easily occur when the floor tile cannot withstand a certain level of load. Accordingly, it can be expected that in the case of a floor tile including no functional intermediate layer, like the floor tile of Comparative Example 1, peeling of the fabric material layer will easily occur. In the case of the floor tile of Comparative Example 2, which included the functional intermediate layer, it appears that peeling occurred because the functional intermediate layer did not exhibit a sufficient adhesive strength due to its thin thickness. However, the floor tile of Example 1 according to the present invention has excellent adhesive strength between the fabric material layer and the functional intermediate layer, and thus it appears that peeling of the fabric material layer does not easily occur.

Experimental Example 2

Evaluation of Cleaning Ease

Sand, an example of an external contaminant, was scattered on the floor tiles of Example 1 and Comparative Example 1, and then the degree of removal of the contaminant by a vacuum cleaner was measured. The same test was performed using wheat flour and dust. The results are shown in Table 2 below and FIGS. 4 to 7.

TABLE 2

| | Ease of cleaning against various contaminants (degree of removal of contaminants by vacuum cleaner) | | |
|---|---|---|---|
| | External contaminant (sand) | Food (wheat flour) | dust |
| Comparative Example 1 | Δ | X | Δ |
| Example 1 | O | O | O |

(O: excellent ease of cleaning, Δ: moderate ease of cleaning, X: poor ease of cleaning).

As shown in Table 2 above, after external pollutant sand, wheat flour and dust were scattered, the contaminants in the floor tile of Comparative Example 1, which had no functional intermediate layer, were not completely removed by the vacuum cleaner, and partially remained. However, it was observed that sand, wheat flour and dust in the floor tile of Example 1, which included the functional intermediate layer, were completely removed.

This was performed to examine the difference in cleaning ease between the presence and absence of the functional intermediate layer. In the case of floor tiles including a fabric material layer, contaminants, when contained in the fabric material layer, are not easily removed due to the structural characteristics of the fabric material layer. However, it could be seen that removal of the contaminants from the floor tile of the present invention was very easy because the floor tile included the floor tile.

Figure 4:
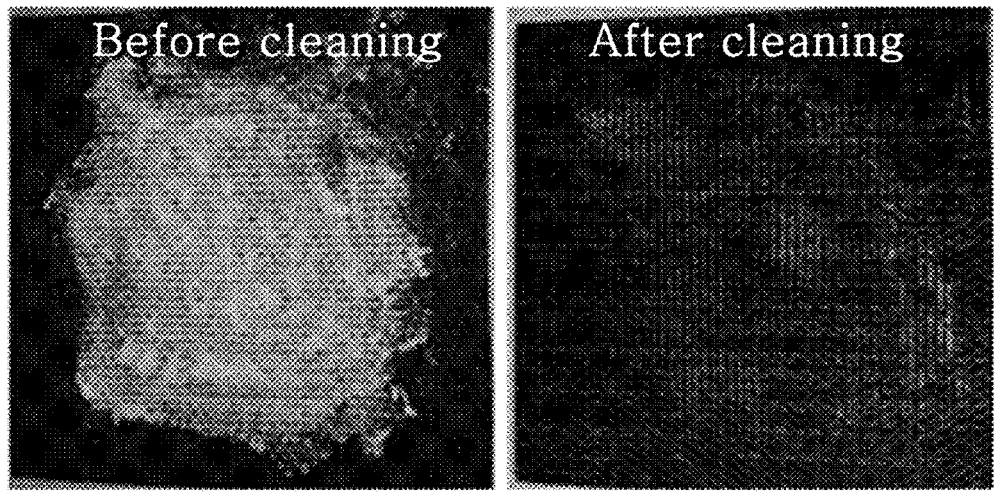
FIG. 4 depicts photographs comparing the surface appearance between before and after cleaning according to the absence of a functional intermediate layer in a floor tile including a fabric material, manufactured in Comparative Example 1.
Figure 5:
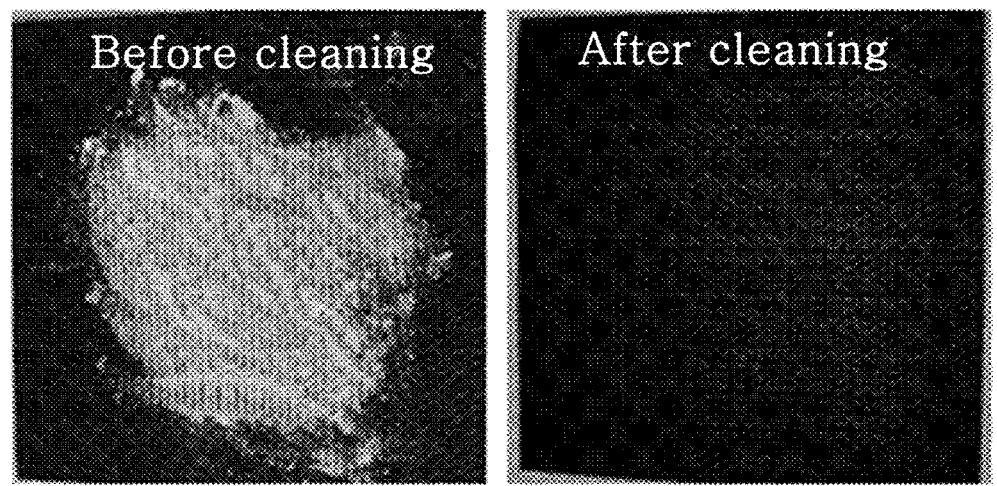
FIG. 5 depicts photographs comparing the surface appearance between before and after cleaning according to the presence of a functional intermediate layer in a floor tile including a fabric material, prepared in Example 1.
Figure 6:
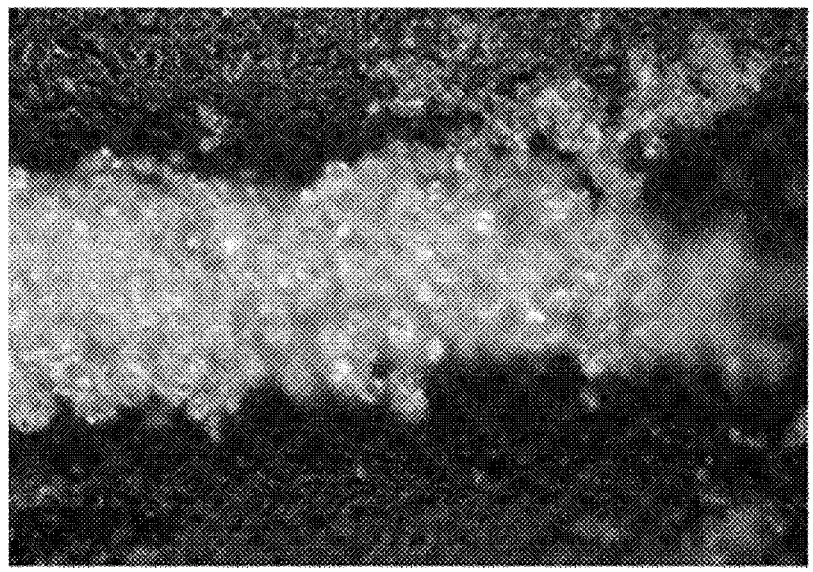
FIG. 6 is a micrograph showing the appearance after cleaning according to the absence of a functional intermediate layer in a floor tile including a fabric material, prepared in Comparative Example 1.
Figure 7:
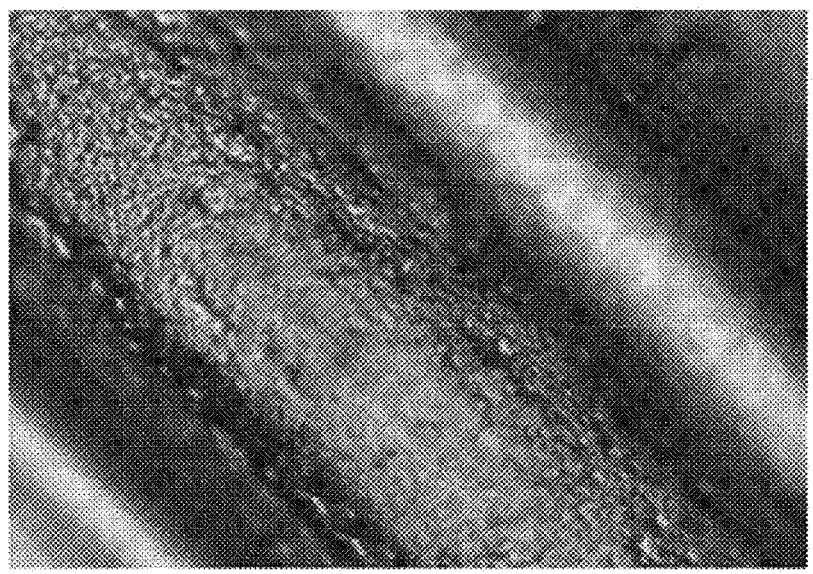
FIG. 7 is a micrograph showing the appearance after cleaning according to the presence of a functional intermediate layer in a floor tile including a fabric material, manufactured in Example 1.

Specifically, FIGS. 4 and 5 are photographs comparing the appearance between before and after cleaning performed after scattering wheat flour. It could be visually observed that wheat flour remained in the floor tile of Comparative Example, which had no functional intermediate layer, even after cleaning (FIG. 4), but floor wheat was completely removed (FIG. 5). Additionally, FIGS. 6 and 7 show the results of microscopic observation performed to examine whether the contaminant would remain in the fabric material layer, in order to confirm cleaning ease. It could be observed that in the floor tile of Comparative Example 1, which had no functional intermediate layer, the contaminant clearly remained (FIG. 6), whereas in the floor tile of Example 1, which included the functional intermediate layer, no contaminant remained (FIG. 7).

Experimental Example 3

Evaluation of Mechanical Properties of Floor Tiles Manufactured Different Methods The tensile strengths of the floor tiles of Example 1 and Comparative Example 3 were measured according to the test method of KSM 3802. The results are shown in Table 3 below.

TABLE 3

|  | Comparative Example 1 | Example 1 |
| --- | --- | --- |
| Tensile strength (N/cm$^2$) | 710-745 | 1512-1637 |

As shown in Table 3 above, the tensile strength of the floor tile of Comparative Example 3, manufactured the impregnation method, was measured to be 710 to 745 N/cm$^2$, and the tensile strength of the floor tile of Example was measured to be 1512 to 1637 N/cm$^2$. This suggests that the difference between the production methods leads to the difference in tensile strength between the floor tiles. Specifically, it can be seen that the floor tile manufactured the heat pressing process shows at least two times higher tensile strength than the floor tile manufactured the impregnation process.

The invention claimed is:

1. A floor tile including a fabric material, the floor tile comprising: a balancing layer; an anti-noise layer; a functional intermediate layer; a fabric material layer; and a surface coating layer,
   wherein the balancing layer is formed on a lower surface of the anti-noise layer,
   wherein the anti-noise layer is formed on a lower surface of the functional intermediate layer,
   wherein the functional intermediate layer is formed on a lower surface of the fabric material layer,
   wherein the fabric material layer is formed on a lower surface of the surface coating layer,
   wherein the fabric material layer comprises a fabric material woven with a thermoplastic resin fiber coated with a polymer resin, and the polymer resin coating the thermoplastic resin fiber does not show big differences in shrinkage rate and melting point from the thermoplastic resin, such that purging phenomenon can be prevented,
   wherein the functional intermediate layer includes a polymer resin, a plasticizer, a stabilizer, a first filler and a pigment, the functional intermediate layer comprises, based on 100 parts by weight of the polymer resin, 5 to 50 parts by weight of the plasticizer, 3 to 10 parts by weight of the stabilizer, 0 to 20 parts by weight of the first filler, and 0.05 to 15 parts by weight of the pigment,
   wherein the polymer resin coating the thermoplastic resin fiber of the fabric material layer and the functional intermediate layer comprise the same kind of polymer resin,
   wherein the balancing layer and the anti-noise layer comprise a second polymer resin and a second filler,
   wherein the polymer resin comprises one or more selected from the group consisting of polyethylene resin, polypropylene resin, ABS (acrylonitrile-butadiene-styrene) resin, polyvinyl chloride resin, acrylic resin, polyester resin, polystyrene resin, polytetrafluoroethylene, rubber, ethylene-vinyl acetate copolymers, and ethylene-propylene copolymers,
   wherein the floor tile further comprises an anti-stretch layer, and
   wherein the thermoplastic resin comprises one or more selected from the group consisting of polyolefin, polyurethane, acrylic resin, polyester, polyvinyl chloride resin, nylon resin, and mixtures thereof.

2. The floor tile of claim 1, wherein the anti-noise layer includes one or more anti-noise layers.

3. The floor tile of claim 1, wherein the surface coating layer comprises a transparent urethane- or acrylic-based resin.

4. The floor tile of claim 1, wherein the plasticizer comprises one or more selected from the group consisting of dioctyl phthalate (DOP), diisononyl phthalate (DINP), diisodecyl phthalate (DIDP), diundecyl phthalate (DUP), trioctyl trimellitate (TOTM), dioctyl adipate (DOA), dioctyl terephthalate (DOTP), 1,2-cyclohexane dicarboxylic acid diisononyl ester (DINCH), dipropylheptylphthalate (DPHP), acetyltributylcitrate (ATBC), vegetable plasticizers, and benzoate.

5. The floor tile of claim 1, wherein the stabilizer comprises one or more selected from the group consisting of a metal soap-based stabilizer, an organic tin stabilizer, and an epoxy-based stabilizer.

6. The floor tile of claim 1, wherein:
   the anti-stretch layer is a glass fiber or nonwoven fabric comprising a third polymer resin; and
   the third polymer resin comprises one or more selected from the group consisting of polyethylene resin, polypropylene resin, ABS (acrylonitrile-butadiene-styrene) resin, polyvinyl chloride resin, acrylic resin, polyester resin, polystyrene resin, polytetrafluoroethylene, rubber, ethylene-vinyl acetate copolymers, and ethylene-propylene copolymers.

7. The floor tile of claim 1, wherein the second polymer resin comprises one or more selected from the group consisting of polyethylene resin, polypropylene resin, ABS (acrylonitrile-butadiene-styrene) resin, polyvinyl chloride resin, acrylic resin, polyester resin, polystyrene resin, polytetrafluoroethylene, rubber, ethylene-vinyl acetate copolymers, and ethylene-propylene copolymers.

8. The floor tile of claim 1, wherein the balancing layer comprises a plurality of irregularities on a lower surface thereof.

9. A method for manufacturing a floor tile including a fabric material according to claim 1, the method comprising: producing a balancing layer, an anti-noise layer, a functional intermediate layer and a fabric material layer by a heat pressing process; and then coating a liquid raw material for surface coating on the fabric material layer, followed by cutting using an UV irradiation device, thereby producing a surface coating layer.

* * * * *